United States Patent [19]
Laurenceau

[11] 3,828,349
[45] Aug. 6, 1974

[54] STACKED BEAM RADAR
[75] Inventor: Bernard Laurenceau, Paris, France
[73] Assignee: Thomson-CSF, Paris, France
[22] Filed: Nov. 17, 1972
[21] Appl. No.: 307,555

[30] Foreign Application Priority Data
Dec. 1, 1971    France .............................. 71.43096

[52] U.S. Cl. .......................................... 343/12 SB
[51] Int. Cl. ............................................... G01s 9/04
[58] Field of Search ................................. 343/12 SB

[56]         References Cited
          UNITED STATES PATENTS
3,016,531   1/1962   Tomiyasu et al. ............... 343/12 SB
3,161,870  12/1964   Pincoffs .......................... 343/12 SB
3,311,913   3/1967   Varela ............................ 343/12 SB Primary Examiner—Richard A. Farley
Assistant Examiner—G. E. Montone
Attorney, Agent, or Firm—Karl F. Ross; Herbert Dubno

[57]          ABSTRACT
A stacked-beam radar comprising a vertical array of fixed horn antennas includes a distributor which produces a group of overlapping radiation patterns in the elevational plane. The emitted waves being plane-polarized, the targets encountered by the outgoing beams normally reflect energy which contains cross-polarized components. In order to retrieve the energy of these latter components each horn antenna works into a set of waveguide-type couplers which separate the two modes of polarization to provide a supplementary group of overlapping radiation patterns interspersed with those of the first group.

17 Claims, 8 Drawing Figures

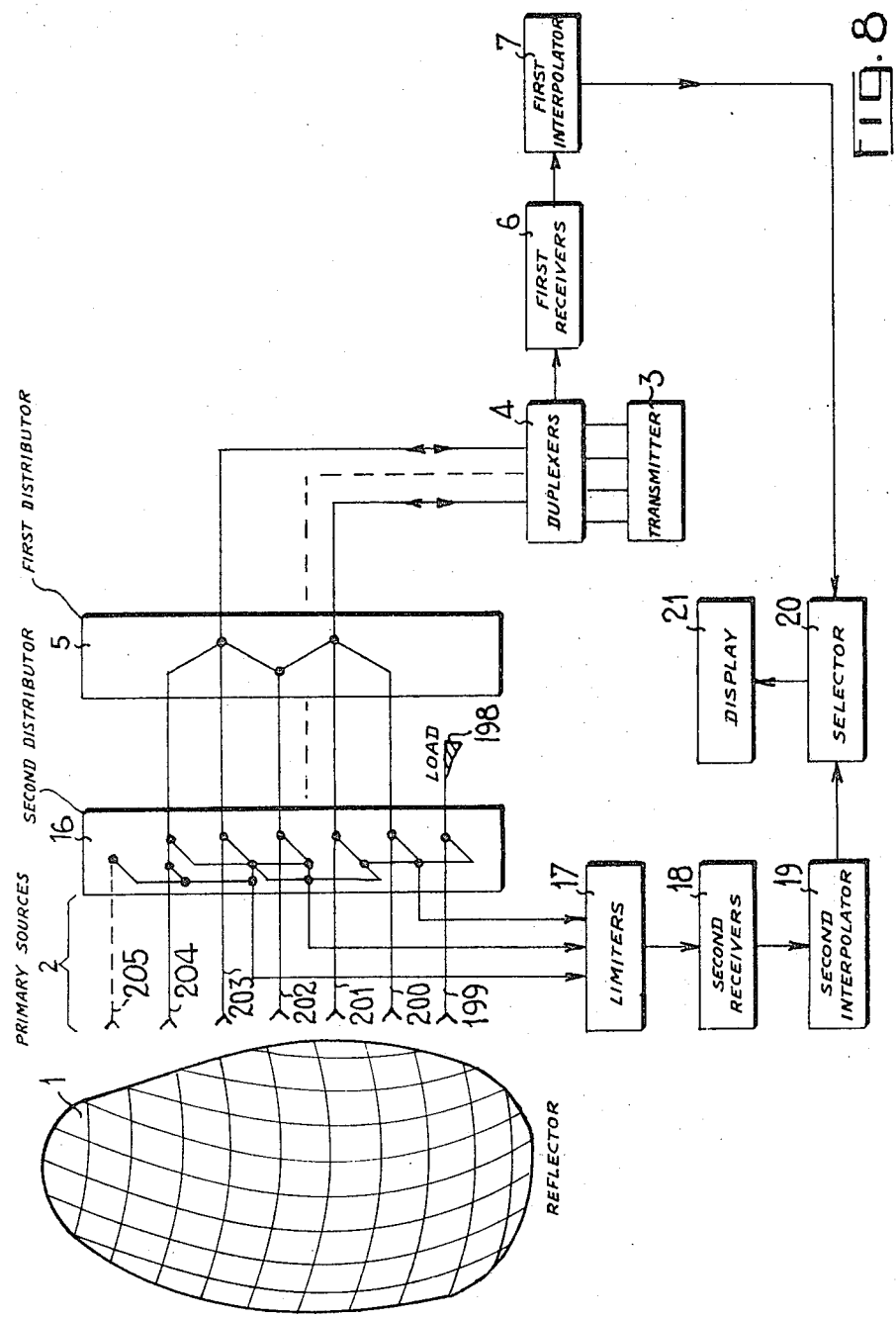

STACKED BEAM RADAR

BACKGROUND.

The present invention relates to improvements in multibeam radars.

The well-known multibeam or stacked-beam radars, which generally use a vertical stack of fixed-elevation pencil beams rotating continuously in azimuth, are three-dimensional radars capable of fully defining the position of a target from the reflected radar energy. In these three-dimensional radars, the expanse of space being monitored (also known as the coverage volume) is scanned by a number of beams positioned at different yet fixed elevational angles, and rotating continuously in the azimuthal direction.

In one known system, details of which may advantageously be found in "Radar Handbook" of Merrill I. Skolnik, McGraw Hill Company, 1970, page 22.4, these beams are produced by a series of primary sources, for example horn radiators arranged in the focal plane of a parabolic reflector. The source located at the focus of the reflector generates a beam directed along the axis of the reflector, whereas the defocused adjacent sources generate beams which are more or less inclined in relation to this axis. Depending upon how these primary sources are coupled, the elevationally staggered beams may intersect one another at a higher or lower level, thus making it possible to improve the accuracy of location, in particular the altitude of a given target, by the so-called interpolation measurement, carried out between two adjacent beams. This consists in simultaneously comparing the amplitudes of the echo signals received within two adjacent beams, whereby it is possible to deduce elevational data on a radar echo within a fraction of the interval separating the axes of the two beams. Thus, it would appear to be advantageous to obtain elevational data by carrying out interpolation between a larger number of beams than are normally available.

SUMMARY OF THE INVENTION.

In accordance with this invention I provide, in a stacked-beam radar having a reflector for electromagnetic-wave energy coming in from a remote target and an array of antennas juxtaposed with that reflector for intercepting different portions of that wave energy as is known per se, a polarization-responsive distribution system which is coupled to the antennas for separating a first set of components of incoming wave energy having one mode of polarization (e.g. in one plane) from a second set of components of incoming wave energy having another mode of polarization (e.g. in a plane orthogonal thereto). Two groups of receivers are connected to this distribution system for respectively obtaining the aforementioned first and second sets of energy components therefrom, in combinations representing a first stack of beams staggered in a predetermined direction (e.g. vertically) and a second stack of beams staggered in the same direction in interspersed relationship with the beams of the first stack. Positional data are derived from the two receiver groups by respective processors in the form of conventional interpolators which combine the energies of adjacent beams of the corresponding stacks.

In order to enable use of the same array of antennas for transmission and reception, a transmitter feeds outgoing wave energy to the distribution system through a set of conventional duplexers. The distribution system advantageously comprises a first and a second distributor inserted in tandem between the duplexers and the antennas, the second group of receivers being connected directly to the second distributor which includes a set of waveguide-type couplers discriminating between the two modes of polarization.

According to a further feature of my invention, the two processors fed by the respective receiver groups are connected to a selector retrieving the more significant data from the output of one or the other processor.

BRIEF DESCRIPTION OF DRAWING.

Other features and advantages of the invention will become apprent from the following description of embodiments illustrated by way of example in the accompanying drawing in which:

FIG. 8 is a schematic view of a multibeam radar in accordance with the invention.

SPECIFIC DESCRIPTION OF A PREFERRED EMBODIMENT.

As indicated above, the object of the invention is to create, in a multibeam or stacked-beam radar system, a series of supplementary beams which are added to and interposed between the beams currently produced by conventional radars of this kind. Though I have heretofore referred exclusively to beams staggered in the elevational plane serving primarily to detect as accurately as possible, through the process of interpolation between two adjacent beams, the altitude of a target detected or tracked by the radar, the invention is in no way limited to elevational stepping of beams. Thus, the principles herein disclosed with specific reference to such beams can be applied equally well to an azimuthal beam distribution.

Figure 1:
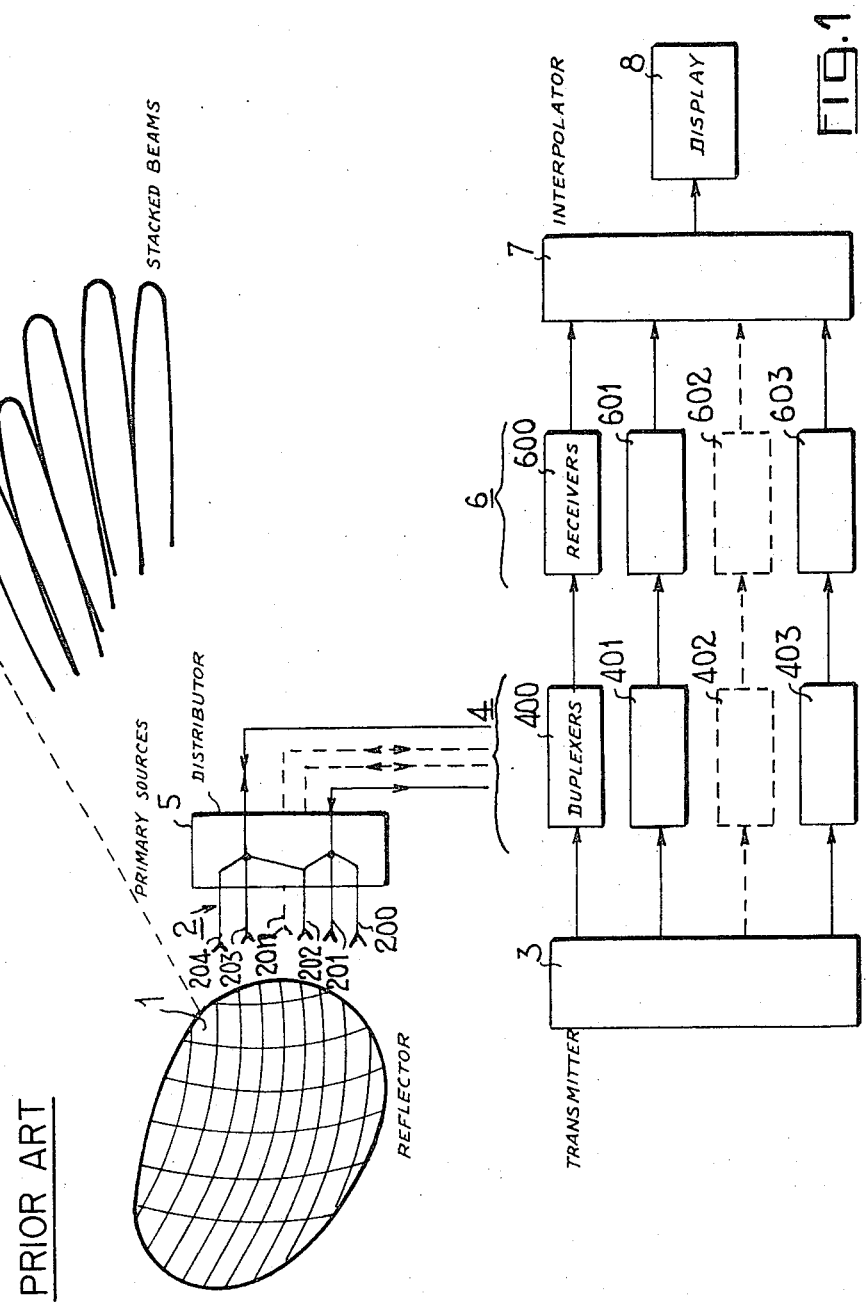
FIG. 1 is a schematic view of a prior-art multibeam radar.

I shall now briefly recapitulate with the help of FIG. 1, the operation of a conventional stacked-beam radar.

It primarily comprises, located in the focal plane of a parabolic reflector 1, a series of primary sources 2, (i.e. horn-type antennas,) individually designated 200 to 205; these sources are supplied, from a transmitter 3 comprising a power-splitter, through duplexers 400 to 403 generally designated 4, via a microwave distributor 5 enabling the primary sources to be coupled and enabling the phase and amplitude of the energy supplied to them to be regulated in order to obtain beams exhibiting certain characteristics. When illuminated by these primary sources 2, the parabolic reflector 1 emits into space the beams whose envelopes have a cosecant-squared profile. Upon reception, the energy returns from one or more targets is concentrated within one or more elementary beams from the primary sources. This energy is transmitted through the distributor 5 and duplexers 4 to a series of independent receivers 6, or 601 to 603. The signals isolated in the different receivers are then subjected to the interpolation process in an interpolator circuit 7 which carries out a comparison between the signals of two adjacent beams. Such an interpolator generally comprises logarithmic amplifiers to which the received signals are applied. The difference between the logarithmic output signals coming from two adjacent beams produces a signal which is proportional to the logarithm of the ratio of the signal amplitudes; this ratio is proportional, with reasonable accuracy, to the difference between the elevational angle of the target and the angle at which the beams intersect one another.

An altitude-data-extraction and display device 8 is connected to the interpolator.

Figure 2:
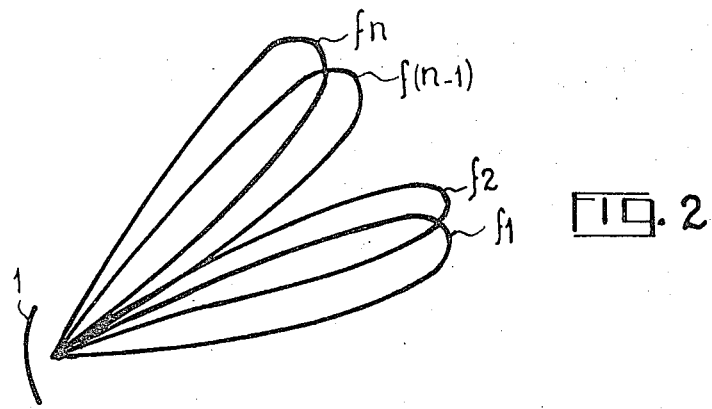
FIG. 2 is a schematic view of the beams obtained from a radar in accordance with FIG. 1.

FIG. 2 symbolically illustrates the pattern of the beams radiated by the reflector 1 as a radar in shown in FIG. 1.

For the sake of simplicity, only four beams have been shown, i.e. the beams $f1$ and $f2$ and the beams $f(n-1)$ and $nf$. The width of each beam and the level at which two adjacent beams intersect each other depend upon the design and setting of the distributor 5.

Figure 3:
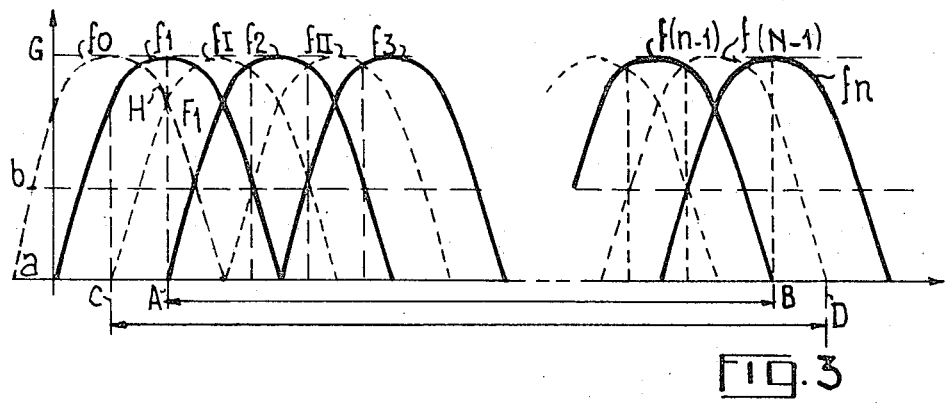
FIG. 3 is a diagram indicating the antenna gain, as a function of the elevational angle, for the two intended groups of beams.

FIG. 3 illustrates the gain curve of the antenna for each beam, as a function of the elevational angle.

The gain curves corresponding to the beams of FIG. 2 have been shown in full lines, these curves being marked by the same references as the corresponding beams. It will be apparent from this diagram that the interpolation carried out between the beams $f1$ to $fn$ makes it possible to obtain elevational data within a range AB bounded by the axes of the terminal beams. For a multibeam radar in accordance with the invention, the aim is to carry out interpolation with a high signal-to-noise ratio. This is achieved by a choice of channels carrying target echo signals of the highest possible strength. This operation, as already explained, leads to an increase in the number of beams on reception. With this in view, a certain number of supplementary beams are provided which are interposed between the existing beams $f1$ to $fn$. The manner in which these beams are obtained will be described in the following. In However, it can be pointed out here, considering the diagram of FIG. 3 I have indicated in dotted lines how these beams are located in relation to those already referred to.

The supplementary beams are designated $f1$ to $f(N-I)$ where $n = N$. It will be observed from this diagram that the range CD, in which interpolation is then effected, is larger than the range AB and comprises encompasses $n + (n-1)$ beams instead of $n$. In fact, if for example we consider a target $F_1$ located in the path of beam $f2$, the corresponding signal can be used for interpolation with the beam f1 only, at the level $a$ at which, the beam $f2$ intersecting the axis of the beam $f1$ at the point A. By contrast, the beam $f1$, in what path the target F is also located, could be used for interpolation with the beam $f1$ at a much higher level, located between the levels $b$ and G, the beam f1 intersecting the axis of the beam $f1$ at $H$. It will be seen, therefore, that the interpolation between the beams of the first groups groups $f1$ to $fn$ and the beams of the second group $f1$ to $f(N − 1)$ gives good results. It should be borne in mind, however, as far as the external beams are concerned, that there is a risk of decorrelation of the signals, and this may alter the results. This can be remedied, especially in respect of regard to the lower elevation angles, by creating on reception at least one further supplementary beam $f0$, produced under conditions similar to those governing the beams of the second group to which it accordingly belongs. However, the primary source 199 (FIG. 8) giving rise to this added beam operates only on reception, the channel which would otherwise link it to the transmitter being terminated in an absorptive load 198.

Figure 7:
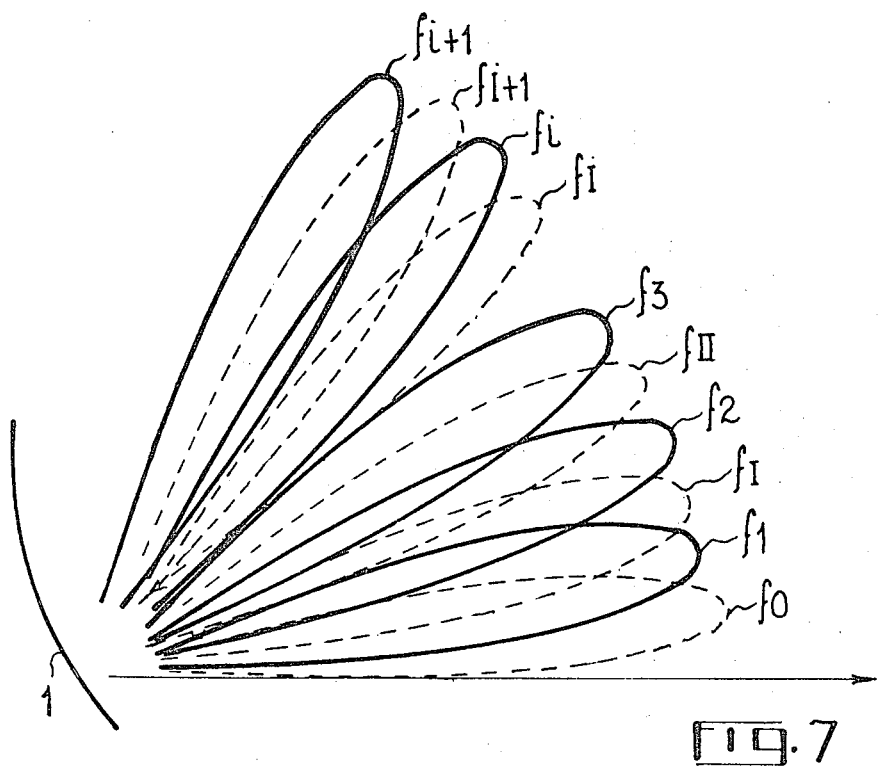
FIG. 7 is a schematic view of the beams obtained from a radar in accordance with the invention.

It will be observed, furthermore, that this beam $f0$ ensures increased possibiltiy of detection at low elevational angles. FIG. 7 schematically illustrates how the beams of the two groups are located in relation to one another, in space. The beam f0, which is the lowest beam that can be produced, is here inclined, at an angle of 0.30 whereas the lowest beam obtainable with a prior-art system is inclined at an angle on the order of 0.5° to the horizontal.

The formation of the supplementary beams is based upon the following observation: each elementary source is supplied, for transmission, with a wave polarized in a certain direction. If an obstacle encountered by this wave is perfectly isotropic, then the reflected wave retains the same polarization. However, in practice, the kinds of obstacles encountered by the emitted waves are complex so that the reflections resulting from such obstacles, bring about depolarization of the reflected wave. The reflected wave is thus received simultaneously in two mutually perpendicular planes of polarization, and with energy levels which differ very little from one another.

That part of the reflected wave which retains its original polarization is processed in the conventional way already explained. The part of the wave reflected with a polarization perpendicular to that original polarization is used in the production of the supplementary beams $f1$ to $f(N-I)$. It is worthy of note that this energy fraction was absorbed in the prior systems, i.e. was lost.

It should be pointed out, too, that the invention may be put into effect with any mode of polarization of the emitted wave, be it linear, circular or elliptical.

Figure 4:
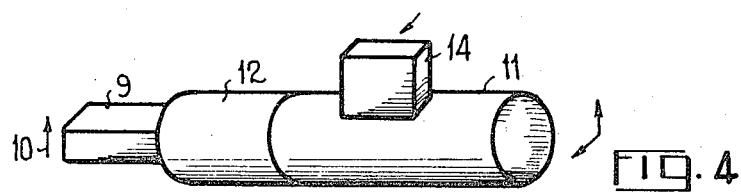
FIGS. 4, 5 and 6 are dual-mode couplers which can be used within the context of the invention.
Figure 5:
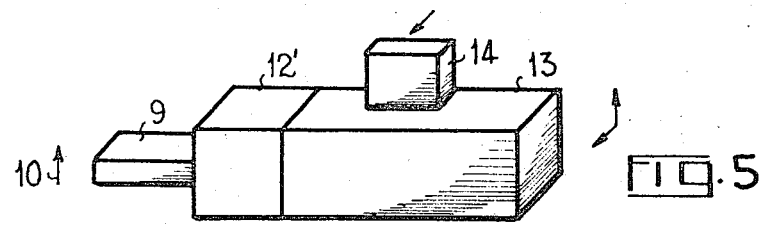
Figure 6:
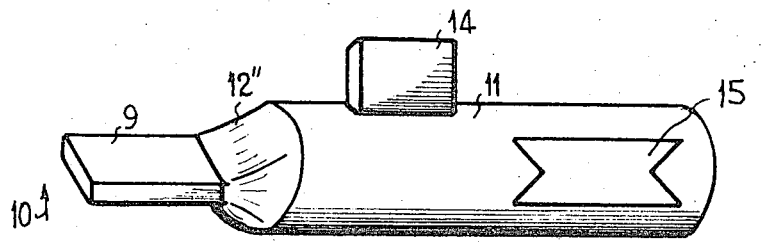

Each primary source is connected to the distributor through a dual-mode coupler constituted by a square-section or circular-section main waveguide connected to an ancillary waveguide of rectangular section. FIGS. 4, 5 and 6 illustrate a waveguide design capable of bidirectionally transmitting the energy exploited in the radar device described. A rectangular waveguide section 9 of each of the couplers shown in FIGS. 4 to 6 is connected to the distributor 5 and is supplied from transmitter 3 with energy whose polarization is linear, for example vertical as indicated by the arrow 10. The rectangular waveguide section 9 transmits this polarized energy to a circular-section main waveguide 11 through a junction 12 or 12" in the case of FIGS. 4 and 6. In the case of FIG. 5, the waveguide extension 9 is coupled to a square-section main waveguide 13 through a transition section 12'.

Branching off these circular or square main waveguides 11, 13 are rectangular-section ancillary waveguides 14 whose longitudinal axis is in each case perpendicular to the longitudinal axis of the input waveguide. These ancillary waveguides are designed to propagate a wave having a polarisation plane perpendicular to that of the emitted wave, their major dimensions being thus orthogonal to those of the associated waveguide extensions 9. The main waveguides 11, 13 are connected to the primary sources. It will be seen that the circular waveguide 11 of FIG. 6 comprises a quarter-wave fin 15 which, when inclined at 45° in relation to the directions of the rectangular-section waveguides 9 and 14, converts the linear (here vertical) polarization of the wave received at the coupler input 9 to circular polarization. However, the orientation of this quarter-wave fin is not limited to 45°; it could equally well be arranged at 22.5°, for example, in relation to the axes of the rectangularsection waveguide. In this case, the polarization of the emitted wave is elliptical. In either instance, a plane-polarized wave is converted into a wave polarized in both planes (on transmission) or vice versa (on reception).

At the instant of reception of the energy returned from one or more targets located in the beams sent out by the paths of the radar, the polarization of the reflected wave will have rotated, at least in the general case and the most probable one of a complex and therefore non-isotropic target.

In this case, the reflected energy is made up of a portion whose polarization is that which existed at the time of transmission and of another portion whose polarization is perpendicular to this original polarization. In the prior systems, this orthogonally polarized wave energy was absorbed in loads provided specially for that purpose. In accordance with the invention, however, this energy is transmitted to receivers 18 (FIG. 8) connected to the waveguides 14; these receivers 18 are normally protected by limiters 17.

In the case illustrated in FIG. 6, which is a more general one and more realistic one, the complex wave, generally an elliptical one, returned from the target is split up into its mutually perpendicular, crossed linear polarization components so that part of the relfected wave is received in the waveguide 9 and the other parts in the waveguide 14 to which a receiver is connected as stated hereinbefore. It can be shown that, from a statistical point of view, the energies of the waves arriving at the receivers connected to the waveguides 9 and 14 are very nearly the same.

FIG. 8 gives a general view of a multibeam or stacked-beam radar incorporating the improvements hereinbefore discussed. In this Figure, almost the entire conventional system of FIG. 1 is included, as the object of the present invention is the provision, on the reception, of a number of beams which are staggered along a given direction and form a stack of beams similar to that provided by the distributor 5 of FIG. 1, the latter stack of beams operating on transmission and reception. As in FIG. 1 the distributor 5, which is connected to the receivers 6 through duplexers 4, couples the primary sources 2 to that there is obtained a number of staggered beams which intersect one another in a predetermined manner, the primary sources 2 being located in the focal plane of the paraboloidal reflector 1.

In a similar fashion, in accordance with the invention, a second distributor 16 is provided which couples the primary sources 2 in a predetermined manner, by means of known means such as those described with reference to FIGS. 4, 5 and 6, and more particularly through their ancillary waveguides 14 as described above, to the receivers 18 which thus are energized by that part of the reflected energy whose polarization differs from that of the emitted energy, owing to the reflection on a non-isotropic target. The coupling of the primary sources is such that the received energy is channeled by distributor 16 into both stacks of staggered beams and also that the beams of the stack formed on reception are interspersed with the beams of the stack formed from the distributor 5. The distributor 16 also couples to the primary sources 200 to 205 the supplementary source 199 already mentioned, which only operates only on reception.

In accordance with the prior art (FIG. 1), in order to define the beam $fl$, the distributor 5 couples to the sources 200, 201 and 202; to define the beam $f2$, it couples the sources 202, 203 and 204.

To obtain beams which are intermediate between those created by the distributor 5, the distributor 16 may for example couple the sources 201, 202 and 203 for the beam fI and the sources 203, 204 and 205 for the beam fII. To define the beam f0, the distributor couples the sources 199, 200 and 201.

The sources are coupled by conventional means including other, for example, circulators.

The distributor 16 couples the primary sources in the manner hereinbefore described and the reception channels thus created are connected by way of limiters 17 and receivers 18 to an interpolator 19.

The interpolator 19 is connected to a logic circuit 20, acting as a selector, which is also connected to the conventional interpolator 7 already shown in FIG. 1. The selector 20 in particular makes it possible to expand the interpolation of the beams to the two groups provided by the radar according to my present invention. This selector system is connected to an extraction and display circuit 21 which displays data determined by the processing of the signals picked up by the radar.

While the operation of this system is which will not be detailed as it is known per se, it is worthy of note that the relative superabundance of beams considerably increases the amount of data which can be used in determining the position of targets and in detecting them. That abundance still further increases the possibilities over those of conventional systems of this type, in particular as far as the attainment of the best signal-to-noise ratio is concerned, something which is highly advantageous in the case of interference when-in order to carry out a measurement-the receiver will be chosen which is associated with the channel exhibiting the best signal-to-noise ratio.

The logic network 20 is designed precisely to select the beams in which accurate signals of high or maximum intensity have been detected the network thus acting in as a peak selector. This logic system can also simply select the beams in which it is simply presence signals constant false-alarm signals have been detected; it can also select signals satisfying both the foregoing criteria, namely presence and intensity.

By way of example, selection system 20 can consist for example of a mosaic of diodes connected in accordance with a scheme which suits the particular application.

In the case where the criterion of strongest signal is employed, in order to compare the signals between each pair of beams and carry out interpolation so that optimum information is obtained, the selection system can be arranged to operate generally as follows: if $fl + f(I+1) > fi + f(i+1)$, or vice versa, with the symbol f representing the intensity of the echo signals detected in the corresponding beams, the set of beams $fI$ and $f(I+1)$ will be chosen for interpolation; conversely, the set of beams $fi$ and $F(i+l)$ will be used if the inequality sign in the foregoing expression is inverted.

If the presence criterion is employed, the selection system 20 can operate as follows:

The presence of a signal in the beam $f1$ enables the interpolation of the beam $f2$ with the adjacent beam $fI$; in this instance the decorrelation phenomenon is prejudicial since it only affects the amplitude of the signals and not their presence.

The presence of signals in the beams $f1$ and $f2$ enables interpolation of the beams $f1$ and $f2$ but inhibits interpolation of the beam $f2$ with a beam $fI$.

The presence of signals in the beams $fI$ and $fII$ enables interpolation of these two beams, and inhibits interpolation of the beams $f1$ and $f2$.

The selection system conti operates in an analogous manner for all the beams of the system.

It is worthy of note that the present invention makes it possible to considerably improve the performance of a side-lobe-blanking device. In effect, in the prior systems the point of interpolation along the beam is very close to the level of the secondary lobes (level $a$ in FIG. 3). On the other hand, in the present system, the lowest interpolation point is located at a level substantially higher than the secondary lobes (level $b$ in FIG. 3) and the setting of the side-lobe-blanking device can be adjusted up to this level.

Thus, an improved stacked-beam radar has been described whose performance is superior to that of the stacked-beam radars hitherto known.

In addition to the book "Radar Handbook" of Merrill I. Skolnik, other literature may be cited which is of interest in connection which features of the present invention not described in detail above, i.e.: U.S. Pat. No. 2,619,635, which describes apparatus for propagating electromagnetic waves having one type of polarization characteristic and receiving waves having either or both of the transmitted polarization and its cross-polarized conjugate; and an article entitled *Air Traffic Cop Eyes "Bandits" too*, Electronics, 16 October 1967 pages 111 and following, relating to a stacked-beam radar using L5 horns.

What is claimed is:

1. In a stacked-beam radar, in combination:
    a reflector for electromagnetic-wave energy coming in from a remote target;
    an array of antennas juxtaposed with said reflector for intercepting different portions of said wave energy;
    polarization-responsive distributing means coupled to said antennas for separating a first set of components of incoming wave energy with one mode of polarization from a second set of components of incoming wave energy with another mode of polarization;
    first receiving means connected to said distributing means for obtaining said first set of components therefrom in combinations representing a first stack of beams staggered in a predetermined direction;
    second receiving means connected to said distributing means for obtaining said second set of components therefrom in combinations representing a second stack of beams staggered in said direction in interspersed relationship with the beams of said first stack;
    first processing means for deriving first positional data, relating to a target, from said first receiving means; and
    second processing means for deriving second positional data, relating to said target, from said second receiving means.

2. The combination defined in claim 1, further comprising selector means connected to said first and second processing means for retrieving the more significant positional data from the output of either of said processing means.

3. The combination defined in claim 1 wherein said first and second processing means comprise respective interpolators for combining the energies of adjacent beams of the corresponding stacks.

4. The combination defined in claim 1 wherein said distributing means comprises a set of couplers each including a main waveguide, an extension of said main waveguide capable of sustaining said one mode of polarization, and an ancillary waveguide branching off said main waveguide, capable of sustaining said other mode of polarization.

5. The combination defined in claim 4 wherein said extension and said ancillary waveguide have rectangular cross-sections with major dimensions in mutually perpendicular planes.

6. The combination defined in claim 5 wherein said main waveguide is of circular cross-section.

7. The combination defined in claim 5 wherein said main waveguide is of square cross-section.

8. A stacked-beam radar comprising:
    a paraboloidal reflector having a focal plane;
    an array of antennas disposed in said focal plane for sending out, via said reflector, wave energy to be echoed back by a remote target and for intercepting different portions of the incoming echoes;
    a transmitter generating the wave energy to be sent out;
    duplexing means connecting said transmitter to said antennas for conveying outgoing wave energy to the latter, said outgoing wave energy having a predetermined mode of polarization;
    first receiving means connected to said duplexing means;
    polarization-responsive distributing means inserted between said duplexing means and said antennas for dividing incoming wave energy into a first set of components having said predetermined mode of polarization and a second set of components of incoming wave energy having a different mode of polarization, and for directing said first set of components to said first receiving means via said duplexing means in combinations representing a first stack of beams staggered in a predetermined direction;
    second receiving means connected to said distributing means for obtaining therefrom said second set of components in combinations representing a second stack of beams staggered in said direction in interspersed relationship with the beams of said first stack;
    first processing means for deriving first positional data, relating to a target, from said first receiving means; and second processing means for deriving second positional data, relating to said target, from said second receiving means.

9. A radar as defined in claim 8 wherein said distributing means comprises a first distributor and a second distributor in tandem, said duplexing means being connected to said first distributor, said second receiving means being connected to said second distributor, and a set of couplers in said second distributor discriminating between said modes of polarization.

10. A radar as defined in claim 9 wherein each of said couplers comprises a main waveguide, an extension of said main waveguide inserted between said main waveguide and said first distributor, and an ancillary waveguide leading from said main waveguide to said second receiving means, said extension being capable of sustaining said predetermined mode of polarization, said ancillary waveguide being capable of sustaining said different mode of polarization.

11. A radar as defined in claim 10 wherein said extension and said ancillary waveguide have rectangular cross-sections with major dimensions in mutually orthogonal planes.

12. A radar as defined in claim 11 wherein said main waveguide is of circular cross-section and is provided with a quarter-wave fin positioned at an angle to said orthogonal planes for converting plane-polarized waves into waves polarized in both planes and vice versa.

13. A radar as defined in claim 9 wherein said antennas include an additional antenna with an output connection leading to said second distributor but terminating short of said first distributor, said additional antenna being positioned at one end of said array for giving rise to a further beam of said second stack lying outside the beams of said first stack.

14. A radar as defined in claim 13 wherein said array is vertical, said additional antenna being disposed at the lower end of said array.

15. A radar as defined in claim 13 wherein said output connection terminates in an absorptive load beyond said second distributor.

16. A radar as defined in claim 8, further comprising selector means connected to said first and second processing means for retrieving the more significant data from the output of either of said processing means.

17. A radar as defined in claim 16 wherein said first and second processing means comprise respective interpolators for additively combining the energies of pairs of adjacent beams of the corresponding stacks, said selector means comparing the results of respective additions carried out by said interpolators.

* * * * *